(12) United States Patent
Le Corre et al.

(10) Patent No.: US 8,442,155 B2
(45) Date of Patent: May 14, 2013

(54) PROCEDURE FOR THE REMOVAL OF THE DC COMPONENT INHERENT IN ANY RADIO FREQUENCY CHAIN

(75) Inventors: Pascal Le Corre, Rennes (FR); Stephane Paquelet, Rennes (FR)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/175,457

(22) Filed: Jul. 1, 2011

(65) Prior Publication Data

US 2012/0002757 A1   Jan. 5, 2012

(30) Foreign Application Priority Data

Jul. 2, 2010   (FR) ...................... 10 55363

(51) Int. Cl.
*H04L 25/06* (2006.01)
(52) U.S. Cl.
USPC .......................... 375/319; 375/346
(58) Field of Classification Search .............. 375/316, 375/319, 346
See application file for complete search history.

(56) References Cited

U.S. PATENT DOCUMENTS

| 5,923,215 | A | * | 7/1999 | Hans | 330/149 |
| 6,480,061 | B2 | * | 11/2002 | Dolman et al. | 330/2 |
| 2009/0212983 | A1 | | 8/2009 | Fukuzawa et al. | |

FOREIGN PATENT DOCUMENTS

WO   WO 03/044949   5/2003

OTHER PUBLICATIONS

French Search Report for FR Application No. 10/55363, dated Feb. 17, 2011.

* cited by examiner

*Primary Examiner* — Shuwang Liu
*Assistant Examiner* — David Huang
(74) *Attorney, Agent, or Firm* — Lucas & Mercanti LLP; Robert P. Michal

(57) ABSTRACT

A procedure for compensating the DC component inherent in any radio frequency chain making it possible from a single measurement, generally located in the digital stage, to determine a set of multiple compensation values that must be applied to multiple compensation points of the analogue chain. The compensation values are calculated by an iterative process converging towards a cancellation of the DC component and avoid saturating amplification components and components of the analogue digital converter.

3 Claims, 2 Drawing Sheets

PROCEDURE FOR THE REMOVAL OF THE DC COMPONENT INHERENT IN ANY RADIO FREQUENCY CHAIN

BACKGROUND OF INVENTION

1. Field of the Invention

This application claims priority to France Application No. 10/55363, filed 2 Jul. 2010, the entire contents of which is hereby incorporated by reference.

This invention relates to the domain of the suppression of the DC component inherent in any radio frequency chain. More particularly in a radio frequency reception device containing an analogue stage to process the signal received from a digitisation of this signal.

When a signal is transmitted by radio it is generally modulated and carried by a "carrier" frequency. When the signal is received, the carrier is removed to provide a "baseband" signal. The signal is amplified and the DC component is reduced to a minimum before the signal is transmitted to the digital receiver. This type of transmission is used, for example, in the field of mobile telephony, Wi-Fi, Bluetooth and other transmissions.

FIG. 1 describes a simplified diagram of this reception. A radio frequency 1.1 is received by the device. It is then processed to remove the carrier by the block 1.2 which provides a baseband signal 1.3. This signal is transmitted to an analogue stage 1.4 intended to carry out an initial analogue processing on the signal. This analogue stage is composed of a multiplicity of analogue components that can, exactly like block 1.2, insert a DC component in the signal passing through these stages. This processing can include filtering but often consists of an amplification of the signal received. This amplified signal 1.5. is then digitalised by an analogue digital converter 1.6. to give a digital signal 1.7 before being transmitted for processing to a digital stage 1.8 depending on the type of device.

The different components of the analogue stages 1.2 and 1.4 are at the source of the appearance of a parasite DC component. The appearance of a DC component originates inter alia through the disparities of analogue components used in the construction of differential stages. The stages carrying out amplification functions should naturally be painstakingly elaborated to avoid successive amplifications of the DC component saturating the analogue-digital converter downstream of the analogue chain. Such a component, even if with a low range, will continue to subsist regardless.

In practical terms, it can be observed that, without processing, these DC components can saturate amplification stages and the converter.

It is therefore indispensable to offer a processing system to remove all or part of the effect caused by these DC components before the converter.

2. Description of Related Art

It is known to carry out in a steady state a retroactive low-pass filter loop to provide compensation at a single point of the analogue chain. This method raises the issue that if the compensation point is at the end of the analogue chain it is still possible for a previous amplification stage to be saturated. On the other hand, the DC component to be corrected is amplified by all the amplification stages and can be significant at this level. If the number of amplifiers of the chain increases, a single compensation point can turn out to be insufficient to avoid saturation upstream and downstream of this point.

The invention aims to resolve these aforementioned problems by a compensation process of the DC component inherent in any radio frequency chain allowing us to determine a set of multiple compensation values from a single measurement, generally situated in the digital stage that must be applied at multiple compensation points of the analogue chain. The compensation points are calculated by an iterative process converging towards a cancellation of the DC component and avoid saturating the amplification components and the analogue digital converter.

BRIEF SUMMARY OF THE INVENTION

The invention relates to a process of removing the. DC component inherent in all radio frequency chains within a radio frequency reception device composed of at least one analogue stage. The said analogue stage is composed of a multiplicity of analogue components which can insert a DC component in the signal passing through the said stage. The said analogue stage has a multiplicity of compensation points. At each compensation point a compensation DC signal is added from the analogue-digital conversion of a compensation value. All these compensation values form a compensation vector with the addition of all the signals to the compensation points aiming to cancel the said DC component measured at the end of the said analogue stage which comprises the following phases:

a) a calculation phase (3.1) of a gain vector with a number of components corresponding to the number of compensation points and of which each component is the product of gain and attenuation values of analogue components located downstream of the corresponding compensation point in the analogue stage;

b) a calculation phase (3.2) of a corresponding unit gain vector by dividing the gain vector by its Euclidean norm;

c) a calculation phase (3.3) of a first term where the value of the DC component estimated to be compensated by the Euclidean norm of the gain vector is divided and making the product of this result with the said unit gain vector, possibly multiplied by a weighting;

d) a calculating phase (3.4) of the new compensation vector by adding to the first term a second term, possibly multiplied by a weighting made up of the current compensation vector or of the dot product of this current compensation vector with the unit gain vector multiplied by this unit gain vector;

e) a phase (3.5) lowering the value obtained to the maximum admissible value by analogue-digital converters used to generate the compensation signals when the value obtained is higher than this maximum admissible value.

According to a particular method of implementing the invention, phases c), d) and e) are repeated iteratively.

The invention also concerns a radio frequency reception device consisting of at least one analogue stage composed of a multiplicity of analogue components that can insert a DC component in the signal passing through the stage where the analogue stage has a multiplicity of compensation points, adding to each compensation point a DC compensation signal from the analogue-digital conversion of a compensation value. All these compensation values form a compensation vector. The addition of the set of signals to the compensation points aims to cancel the said DC component measured at the end of the analogue stage, which consists of:

a) methods of calculating a gain vector with a number of components corresponding to the number of compensation points and of which each component is the product of gain and attenuation values of analogue components located downstream of the corresponding compensation point in the analogue stage;

b) methods of calculating the corresponding gain vector by dividing the gain vector by its Euclidean norm;

c) methods of calculating a first term where the value of the DC component estimated to be compensated by the Euclidean norm of the gain vector is divided making the product of this result with the unit gain vector, possibly multiplied by a weighting;

d) methods of calculating the new compensation vector by adding a second term to the first term, possibly multiplied by a weighting value consisting of the current compensation vector or of the dot product of this current compensation vector with the unit gain vector multiplied by the unit gain vector;

e) methods of lowering the value obtained from the maximum admissible value by the analogue-digital converters used to generate the compensation signals when the value obtained is higher than this maximum admissible value.

The characteristics of the invention mentioned above as well as others will appear more clearly on reading the following description of an implementation example, the description being made in relation to the appended drawings, among which:

DETAILED DESCRIPTION OF THE INVENION

From a single measuring point of the DC voltage located in the digital domain, this document shows that it is possible to control N subtracters responsible for removing the overall DC component. The implementation example shows the procedure for a value N equal to three subtracters but which can be directly extended to any number N subtracters, N being higher than or equal to two.

When it is implemented from an analogue-digital converter, the DC component subtracter has of course a limited dynamic. Hence, it seems important to remove the DC component once it appears, simply because its propagation through the amplification stages can lead to making a removal done downstream impossible for lack of a dynamic for analogue-digital converters. A solution consists of placing multiple compensation points, particularly in front of each amplifier.

The method presented in this document aims to control these multiple compensation points, under non-saturation constraints, from a single measurement of the DC component made at the end of the chain. The fact of having a single point of measurement makes the system to be resolved under-determined. But considering the dynamic limitation of analogue-digital converters, the system becomes constrained and soluble while accepting a low implementation complexity solution.

Figure 1:
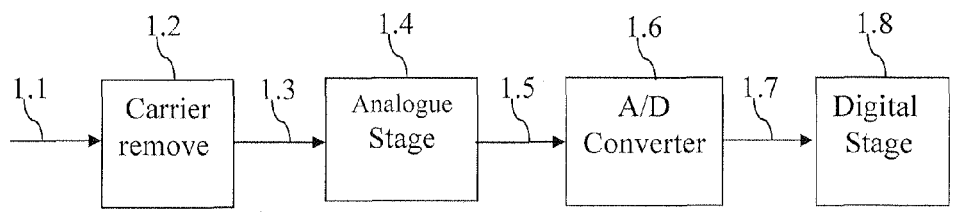
FIG. 1 shows a simplified diagram of a radio frequency reception.
Figure 2:
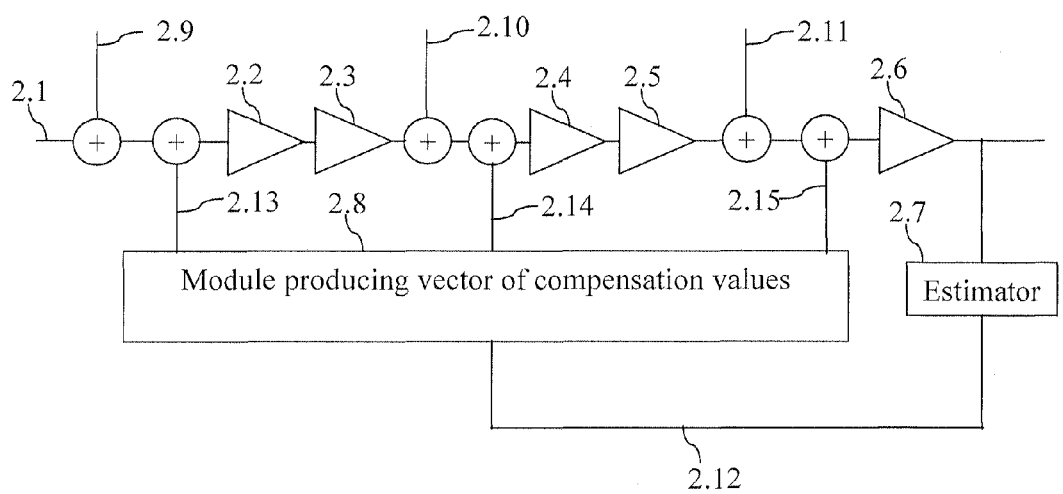
FIG. 2 shows the architecture of an implementation example of the invention.

FIG. 2 shows the architecture of the implementation example. In this example, we consider three amplification stages and of course three compensation points. However, the method can he generalised to any type of chain with at least two compensation points.

The baseband signal 2.1 is the input of the system characterised by an input voltage $V_{in}$. An initial amplification stage is composed of an amplifier 2.2 whose gain is named $G_1$, followed by an attenuator 2.3 whose attenuation value is marked $A_1$. The second amplification stage is composed of an amplifier 2.4 whose gain is named $G_2$, followed by an attenuator 2.5 whose attenuation value is marked $A_2$. The third amplification stage is composed of a amplifier 2.6 whose gain is named $G_3$. The signal coming out of the amplifier is characterised by its output voltage marked $V_{out}$. The DC voltage of the output signal is calculated in a supposedly perfect way by the estimator 2.7 which is generally inserted into the digital stage and is therefore estimated after the analogue digital conversion of the output signal. This DC voltage 2.12 named $\delta_{ff}$ is provided to a module 2.8 according to the invention which is responsible for producing the vector of compensation values 2.13, 2.14 and 2.15 named respectively $-\Delta_1$, $-\Delta_2$ and $-\Delta_3$. These values are represented with a sign "−" to signify that the adders will remove a value $\Delta_i$ from the signal. It must be understood here that the compensation values are calculated digitally in the module 2.8 and that the values are transmitted to analogue-digital converters to produce the compensation signal. The voltages added to the signal 2.9, 2.10 and 2.11 fictively represent the addition to the signal of DC voltage values which are really added by the different analogue components composing the analogue chain. Their values are named $\delta_1$, $\delta_2$ and $\delta_3$. These DC voltages are supposed to he removed. Their values are not known beforehand.

Initially, the gain values $G_i$ and the attenuator values of $A_i$ are supposed to be known, but in the iterative implementation method a significant tolerance on a supposed value of these gains and attenuators is enough to ensure convergence towards cancellation of the DC component.

To resolve the problem, the existence of additional fictive DC voltages to the input of each amplifier is considered. The $\Delta_1$, $\Delta_2$, and $\Delta_3$ removal commands applied at instant t are considered so imperfect that it is possible to measure a final non-zero value of the DC component at the end of the chain marked $\delta_{ff}$.

It is also supposed that the block capable of estimating the DC voltage at the end of the chain is able to perfectly extract the DC voltage in the output signal, directly measured for a zero time-average input signal, which in practice is always true. This measure is linked to other parameters at instant t by:

$$(((\delta_1-\Delta_1)G_1A_1+(\delta_1-\Delta_2))G_2A_2+(\delta_3-\Delta_3))G_3=\delta hd ff \quad (1)$$

The problem now consists of seeking new $\Delta'_1$, $\Delta'_2$ and $\Delta'_3$ controls allowing the DC component to be cancelled at the end of the chain at instant t' with t'>t.

The new $\overline{\Delta}'$ compensation control vector to be applied to instant t' therefore verifies the relation (2) at instant t':

$$(((\delta_1-\Delta'_1)G_1A_1+(\delta_2-\Delta'_2))G_2A_2+(\delta_3-\Delta'_3))G_3=0 \quad (2)$$

To simplify the paperwork we will adopt a vector notation for control vectors. We will define the following vectors:

$$\overline{\Delta}=[\Delta_1 \Delta_2 \Delta_3]^T;$$

$$\overline{\Delta}'=[\Delta'_1 \Delta'_2 \Delta'_3]^T;$$

$$\overline{\Delta}^{diff}=\overline{\Delta}'-\overline{\Delta}=[\Delta_1^{diff} \Delta_2^{diff} \Delta_3^{diff}]^T$$

From equations (1) and (2) and by introducing the differential vector control marked $\overline{\Delta}^{diff}$ comes:

$$((\Delta_1^{diff}G_1A_1+\Delta_2^{diff})G_2A_2+\Delta_3^{diff})G_3-\delta_{ff}=0 \quad (3)$$

It can be noted that the fictive additional voltages disappear from the equation system to be resolved. By introducing the gain vector $\overline{G}$ below:

$$\vec{G} = \begin{bmatrix} G_1 G_2 G_3 A_1 A_2 \\ G_2 G_3 A_2 \\ G_3 \end{bmatrix}. \quad (3)$$

The equation (3) is now written:

$$\overline{G} \cdot \overline{\Delta}^{diff} - \delta_{ff} = 0 \quad (4)$$

Generally, the gain vector $\overline{G}$ is expressed as a vector with the number of components corresponding to the number of compensation points and where each component is the product of gain and attenuation values for analogue components located downstream of the compensation point in the analogue stage.

This non-constrained system is under-determined. But if it is considered that one of the aims of the invention consists in avoiding the saturation of analogue-digital converters, an additional constraint is determined. The converters used to generate compensation signals $\Delta_i$ are considered to be removed from the level of compensation points. $\Delta_{max}$ is noted as the maximum deviation of these converters, i.e. the maximum possible compensation value at the level of each compensation point. Each component of the new control vector in absolute value must be less than $\Delta_{max}$. The mathematical formula deriving from this is written:

$$\|\overline{\Delta} + \overline{\Delta}_{diff}\|_{28} \leq \Delta_{max} \quad (5)$$

The infinite norm signifies that each component of the control vector is less than the absolute value at $\Delta_{max}$. Given the phenomenon of the quantification of converters and taking into account the constraint defined by the equation (5), it is not certain that the equation (4) admits of a solution. The problem can be generalised by seeking to minimise the difference $\overline{G} \cdot \overline{\Delta}^{diff} - \delta_{ff}$, which will not deprive us from finding a solution making this difference zero if this is still possible.

If P is the new problem to resolve, it is formulated as follows:

$$P: \begin{cases} \text{argmin}_{\overline{\Delta}_{diff}} \left| \vec{G} \cdot \overline{\Delta}^{diff} - \delta_{ff} \right| \\ \|\vec{\Delta} + \overline{\Delta}^{diff}\|_{\infty} \leq \Delta_{max} \end{cases}$$

The mathematical formula above means that what is being sought is the differential vector minimising in absolute value the difference $|\overline{G} \cdot \overline{\Delta}^{diff} - \delta_{ff}|$ under the constraint $$\|\overline{\Delta} + \overline{\Delta}^{diff}\|_{\infty} \leq \Delta_{max}.$$

This mathematical approach integrates the fact that each control should not saturate the analogue digital converters. It aims to redeploy the cancellation control of the DC component on the three compensation points. It takes into account the fact that there is no certainty of completely cancelling the DC component because, inter alia, of problems of quantification and of the imperfect knowledge of the exact gain values of analogue components.

It may seem desirable that each compensation value $\Delta_i$ will exactly compensate the DC component $\delta_i$ inserted upstream into the analogue chain of the compensation point. This approach nevertheless includes inconveniences. It requires possession of as many measurement points as compensation points, which will be costly. And even if these measuring points are available, the compensation values corresponding to these measured values that should be applied would be likely to saturate the converters. One of the advantages of the distribution over all the compensation points to be provided consists in limiting these saturations.

To resolve this mathematical problem with the infinite norm leads to difficulties. We suggest defining a related problem for which we justify that, for main cases, the solutions to this new problem are also solutions of the problem to be resolved.

Let us call this related problem P*. This new problem uses the Euclidean norm subscripted 2 in the formulas and no longer the infinity norm.

The question now is to seek to minimise the controls so as not to be in a duty point likely to saturate the converters. The vector controls which could previously be part of a cube, in the three dimensional case of three compensation points, are no longer limited. The fact of seeking to minimise the vector norm has, despite everything, the effect of generally minimising the vector values, but without guaranteeing that any of these values can exceed the maximum threshold $\Delta_{max}$.

The problem is rewritten this time stipulating that we will seek to determine the controls of minimum amplitudes under the constraint of completely cancelling the DC component at the end of the chain. This new formulation leads to resolving the following P* problem:

$$P^*: \begin{cases} \text{argmin}_{\overline{\Delta}_{diff}} \|\vec{\Delta} + \overline{\Delta}^{diff}\|_2 \\ \vec{G} \cdot \overline{\Delta}^{diff} - \delta_{ff} = 0 \end{cases}$$

We can verify that:
If $\overline{\Delta}^{diff}$ is a solution to P* and $\|\overline{\Delta} + \overline{\Delta}^{diff}\|_{\infty} \leq \Delta_{max}$ then $\overline{\Delta}^{diff}$ is also a solution of P; and
If the control obtained does not verify the saturation constraint, it is always possible to suggest an admissible control of the value $\Delta_{max}$ if the value obtained by the calculations is higher than $\Delta_{max}$ in absolute value. This is said to be saturating the control.

Assuming that there is a calibration phase capable of providing a first vector $\overline{\Delta}$ with fair approximation, another alternative could be to find solutions that seek not to deviate too much from the calibration controls. In this case we would seek to minimise the corrections made to the compensation values and not the latter. This P** problem is expressed as follows:

$$P^{**}: \begin{cases} \text{argmin}_{\overline{\Delta}_{diff}} \|\overline{\Delta}^{diff}\|_2 \\ \vec{G} \cdot \overline{\Delta}^{diff} - \delta_{ff} = 0 \end{cases}$$

This alternative approach leads to a similar resolution as that of P* which we develop below.

To resolve the problem P*, we will break down the gain vector $\overline{G}$ in a system of orthonormed coordinates. The first dimension is that of the vector itself and its orthogonal plan. We have to remember that we are now thinking in three dimensions because the implementation example is based on 3 compensation points, but the thinking applies in a similar way to N dimensions, N higher or equal to two. This introduces the following notation:

$$\overline{G} = \|\overline{G}\| \overline{g} \quad (6)$$

A natural breakdown of this space consists in choosing as the system base the trihedron $\{\overline{g}, \overline{g}_\theta, \overline{g}_\phi\}$ composed of the unit vector $\vec{g}$ which has $\vec{G}$ and is completed by two vectors $\vec{g}_\theta$ and $\vec{g}_\phi$ according to the system of spherical coordinates.

The differential control vector is thus written:

$$\vec{\Delta}^{diff} = \Delta_g^{diff}\vec{g} + \Delta_\theta^{diff}\vec{g}_\theta + \Delta_\phi^{diff}\vec{g}_\phi$$

With the help of this sound system of coordinates, we will resolve the equation (4) to obtain the general form of the differential control vector.

$$\vec{G}\cdot\vec{\Delta}^{diff} - \delta_{ff} = \|\vec{G}\|\vec{g}\cdot\vec{\Delta}^{diff} - \delta_{ff}$$

$$= \|\vec{G}\|\left(\Delta_g^{diff}\underbrace{\vec{g}\cdot\vec{g}}_{=1} + \Delta_\theta^{diff}\underbrace{\vec{g}\cdot\vec{g}_\theta}_{=0} + \Delta_\varphi^{diff}\underbrace{\vec{g}\cdot\vec{g}_\varphi}_{=0}\right) - \delta_{ff}w$$

$$= \|\vec{G}\|\Delta_g^{diff} - \delta_{ff}$$

$$= 0$$

This comes to:

$$\Delta_g^{diff} = \frac{\delta_{ff}}{\|\vec{G}\|} \qquad (7)$$

We can see that the resolution of the equation (4) leads only to fixing the component of the differential control vector in the direction of $\vec{g}$. The general form of the differential control vector allows us to obtain a zero DC component which can be expressed thus:

$$\vec{\Delta}^{diff} = \frac{\delta_{ff}}{\|\vec{G}\|}\vec{g} + \Delta_\theta^{diff}\vec{g}_\theta + \Delta_\varphi^{diff}\vec{g}_\varphi \qquad (8)$$

With $\Delta_\theta^{diff}$ and $\Delta_\phi^{diff}$ two random scalars.
In order to simplify the notations we can put down:

$$\alpha = \Delta_\theta^{diff} \text{ and } \beta = \Delta_\phi^{diff};$$

The equation (8) then becomes:

$$\vec{\Delta}^{diff} = \frac{\delta_{ff}}{\|\vec{G}\|}\vec{g} + \alpha\vec{g}_\theta + \beta\vec{g}_\varphi. \qquad (9)$$

To calculate the effective compensation values, we must remember that the problem P* sought to minimise the Euclidean norm $\|\vec{\Delta}+\vec{\Delta}^{diff}\|_2$.

To calculate this Euclidean norm, we start by breaking down the vector control $\vec{\Delta}$ according to the base $\{\vec{g},\vec{g}_\theta,\vec{g}_\phi\}$.

$$\vec{\Delta} = \Delta_g\vec{g} + \Delta_\theta\vec{g}_\theta + \Delta_\phi\vec{g}_\phi$$

This comes to:

$$\|\vec{\Delta}+\vec{\Delta}^{diff}\|_2 = \left(\Delta_g + \frac{\delta_{ff}}{\|\vec{G}\|}\right)^2 + (\Delta_\theta + \alpha)^2 + (\Delta_\varphi + \beta)^2$$

The solutions minimising this norm are:

$$\alpha = -\Delta_\theta;\ \beta = -\Delta_\phi$$

This ends up with a solution which provides the expression of the new compensation vector $\vec{\Delta}'$ allowing us to cancel the DC component at instant t'>t by minimising the Euclidean norm of the control vector:

$$\vec{\Delta}+\vec{\Delta}^{diff} = \left(\Delta_g + \frac{\delta_{ff}}{\|\vec{G}\|}\right)\vec{g} = \left(\vec{\Delta}\cdot\vec{g} + \frac{\delta_{ff}}{\|\vec{G}\|}\right)\vec{g} = \frac{\delta_{ff}}{\|\vec{G}\|}\vec{g} + (\vec{\Delta}\cdot\vec{g})\vec{g}$$

Similarly, the problem P** leads to the solution:

$$\vec{\Delta}+\vec{\Delta}^{diff} = \frac{\delta_{ff}}{\|\vec{G}\|}\vec{g} + \vec{\Delta}$$

It should be remembered that this solution should as a rule avoid saturating 1e analogue-digital converters. Components whose absolute value is higher than $\Delta_{max}$ are thus reduced to this value $\Delta_{max}$.

These formulas can be generalised to define a family of formulas allowing us to resolve the technical problem.

On the one hand we do not have access to the theoretical value of $\vec{G}$ but only to a measured approximation we will call $\vec{\hat{G}}$ allowing us to deduce another approximate value $\vec{\hat{g}}$.

It can be shown that the convergence of the equations is maintained if we replace the theoretical gain values by the approximations on condition that the following inequality is complied with:

$$\left|1 - \frac{\vec{\hat{g}}\cdot\vec{G}}{\|\vec{\hat{G}}\|}\right| < 1$$

Expressed in the form of recursively defined sequences, we end up with the following formulas:

$$P^*:\vec{\Delta}_{n+1} = \left(a_n\vec{\Delta}_n\cdot\vec{\hat{g}} + b_n\frac{\delta_n^{ff}}{\|\vec{\hat{G}}\|}\right)\vec{\hat{g}}$$

Figure 3:
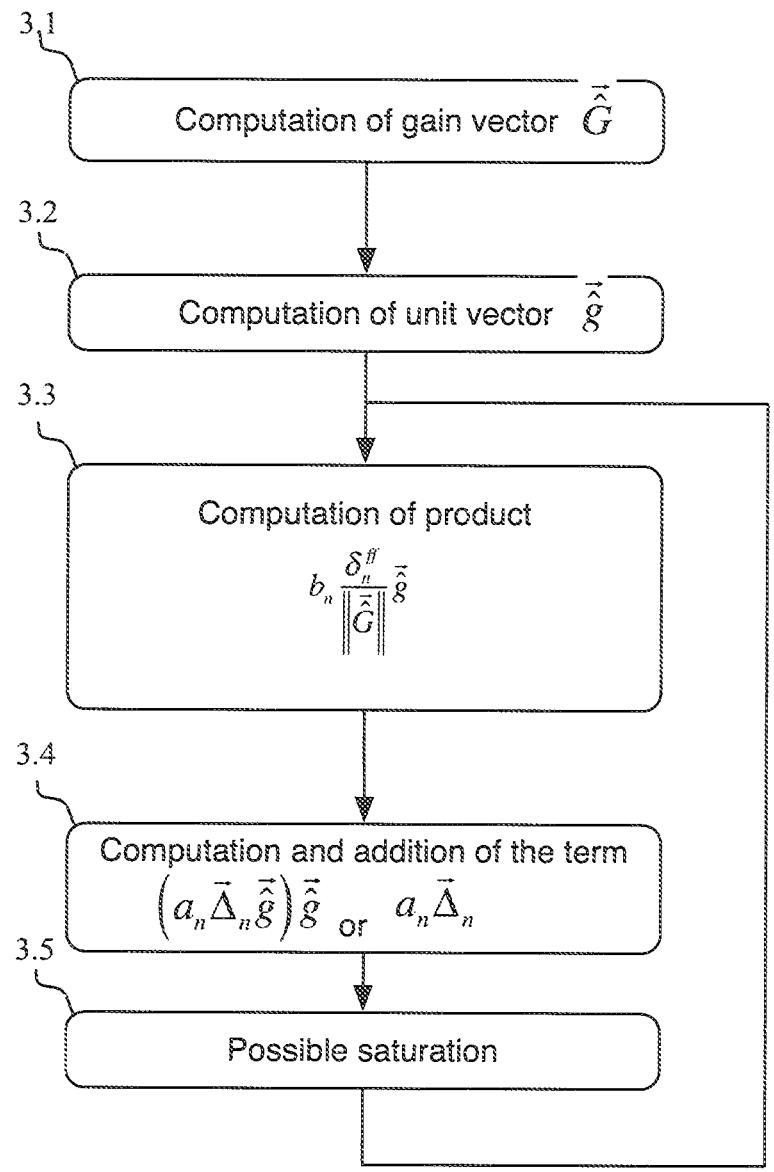
FIG. 3 shows a flow chart of the calculation procedure for the compensation vector according to an implementation example of the invention.

And $$P^{**}:\vec{\Delta}_{n+1} = a_n\vec{\Delta}_n + b_n\frac{\delta_n^{ff}}{\|\vec{\hat{G}}\|}\vec{\hat{g}}$$

where the sequences $a_n$ and $b_n$ are weighting factor sequences. These new formulas remain convergent and thus resolve the technical problem if these weighting factor sequences comply with the condition of tending to 1 if n tends towards infinity. The $\delta_n^{ff}$ which appears in the formula corresponds to $\delta_{ff}$ in other formulas measured in each iteration. In practice, the procedure cancelling the DC component in a radio frequency reception device is implemented according to the flow chart in FIG. 3

According to an initial step 3.1, the gain vector $\vec{G}$ of the analogue stage is calculated. This calculation can take into account the prior knowledge of the components of the stage or be measured during the device's manufacturing process. Advantageously, since this vector is ideally invariant, its value is stored in the device's memory. According to a second step 3.2, the corresponding unit gain vector $\vec{g}$ is deduced from the $\vec{G}$ vector by dividing the gain vector by its Euclidean norm. This vector is also advantageously stored in the device's memory. According to step 3.3 a first term is calculated corresponding to $$\frac{\delta_{f\!f}}{\|\overline{G}\|}\overline{g}$$

taking the value to be compensated $\delta_{f\!f}$ divided by the norm of the gain vector $\|\overline{G}\|$ and by making the product of this value with the unit gain vector $\overline{g}$. The initial value of the compensation vector $\overline{A}$ can be obtained in a variable manner. It can result from tests or calculations made during the manufacture of the device. It can also be calculated by uniform distribution of an initial value to be compensated $\delta_{f\!f}$ on the multiplicity of compensation points.

During a step 3.4, the new compensation vector $\overline{A}+\overline{A}^{d\!i\!f\!f}$ is calculated by adding to the first term calculated in step 3.3 a second term made up of the scalar product of the standard compensation vector $\overline{A}$ by this vector unit gain vector $\overline{g}$. The initial value of the compensation vector $\overline{A}$ can be obtained in a variable manner. It can result from tests or calculations done during the production of the device. It can also be calculated by uniform distribution of an initial value to be compensated $\delta_{f\!f}$ on the multiplicity of compensation points. Alternatively, if we elect to implement the solution of the problem P** we simply add a second term composed of the standard compensation vector $\overline{A}$.

During step 3.5, we can verify that none of the components of the compensation vector obtained exceeds the capacities of the analogue-digital converters which will produce the corresponding compensation signal. If this is the case, the value obtained is reduced to the maximum admissible value. Although in theory a single calculation phase can allow the DC component generated by the different analogue components of the analogue stage to be cancelled, this is not always the case. Because of the imperfect knowledge of the different gains and the possible saturation of some compensation values, even taking into account a possible development in time of the behaviour of some components and because the input signal $V_{in}$ is not identically zero but time-average zero, it is a good idea to iteratively repeat steps 3.3 to 3.5. The calculation done iteratively in this way guarantees us that it will evolve towards and preserve a cancellation of the DC component generated.

The invention claimed is:

1. Procedure for the removal of the DC component inherent in any radio frequency chain within a radio frequency reception device composed of at least one analogue stage, said analogue stage comprising a multiplicity of analogue components likely to insert a DC component in the signal passing through the stage, said stage comprising a multiplicity of compensation points, a DC compensation signal obtained from the analogue-digital conversion of a compensation value being added to each compensation point, all these compensation points forming a compensation vector, the addition of all the signals to the compensation points aiming to cancel the said DC component inherent to the radio frequency chain being measured at the end of the said analogue stage, which is characterised in that it comprises the following steps:
    a) a computation step (3.1) of an approximate gain vector with a number of components corresponding to the number of compensation points and of which each component is the product of gain and attenuation values of analogue components located downstream of the corresponding compensation point in the analogue stage;
    b) a computation step (3.2) of the corresponding unit gain vector by dividing the gain vector by its Euclidean norm;
    c) a computation step (3.3) of a first term, where said value measured at the end of the said analogue stage to be compensated is divided by the gain vector norm and making the product of this result with the unit gain vector, wherein the first term is multiplied by a weighting value;
    d) a computation step (3.4) of a new compensation vector by adding to the first term a second term, constituted by the current compensation vector or of the scalar product of this current compensation vector with the unit gain vector multiplied by this unit gain vector, wherein the second term is multiplied by a weighting value;
    e) a lowering step (3.5) of a component of the new compensation vector to a maximum admissible value of analogue-digital converters used to generate the compensation signals when a value of the obtained component of the new compensation vector is higher than the admissible maximum value.

2. Procedure according to claim 1, characterised in that phases c), d) and e) are repeated iteratively.

3. Radio frequency reception device comprising:
    at least one analogue stage, comprising a multiplicity of analogue components which can insert a DC component in the signal passing through the stage, characterised in that the said analogue stage comprises a multiplicity of compensation points, a DC compensation signal obtained from the analogue-digital conversion of a compensation value being added to each compensation point, all these compensation points forming a compensation vector, the addition of all the signals to the compensation points aiming to cancel the said DC component measured at the end of the said analogue stage, and
    a module for producing the vector of compensation values, the module causing the device to perform:
    a) calculating a gain vector with a number of components corresponding to the number of compensation points and of which each component is the product of gain and attenuation values of analogue components located downstream of the corresponding compensation point in the analogue stage;
    b) calculating the corresponding unit gain vector by dividing the gain vector by its Euclidean norm;
    c) calculating a first term where the value to be compensated is divided by the gain vector norm and making the product of this result with the unit gain vector, wherein the first term is multiplied by a weighting value;
    d) calculating a new compensation vector by adding to the first term a second term, composed of the standard constituted by the current compensation vector or of the scalar product of this current compensation vector with the unit gain vector multiplied by this unit gain vector, wherein the second term is multiplied by a weighting value;
    e) lowering the value of a component of the new compensation vector obtained to the maximum admissible value of analogue-digital converters used to generate the compensation signals when a value of the obtained component of the new compensation vector is higher than the admissible maximum value.

* * * * *